United States Patent
Makino et al.

(10) Patent No.: US 9,142,944 B2
(45) Date of Patent: Sep. 22, 2015

(54) CASE

(71) Applicant: Yazaki Corporation, Tokyo (JP)

(72) Inventors: Masahiro Makino, Makinohara (JP); Kouji Ueyama, Makinohara (JP)

(73) Assignee: Yazaki Corporation, Tokyo (JP)

( * ) Notice: Subject to any disclaimer, the term of this patent is extended or adjusted under 35 U.S.C. 154(b) by 54 days.

(21) Appl. No.: 14/085,992

(22) Filed: Nov. 21, 2013

(65) Prior Publication Data

US 2014/0151112 A1    Jun. 5, 2014

(30) Foreign Application Priority Data

Nov. 30, 2012 (JP) .................................. 2012-262085

(51) Int. Cl.
*H02G 3/08*    (2006.01)

(52) U.S. Cl.
CPC .................................... *H02G 3/088* (2013.01)

(58) Field of Classification Search
CPC ......... H02G 3/08; H02G 3/081; H02G 3/088; H02G 3/16; H05K 5/00; H05K 5/02; H05K 5/04; B60R 16/00; B60R 16/0239; B60R 16/02; H01H 9/02; H01H 9/04
USPC ..................... 174/50, 520, 59, 535, 559, 560; 439/76.1, 76.2, 949, 535; 361/600, 361/601, 679.01, 730, 752, 760, 761
See application file for complete search history.

(56) References Cited

U.S. PATENT DOCUMENTS

| 6,774,309 B2 * | 8/2004 | Kasai ............................... 174/50 |
| 7,633,008 B2 * | 12/2009 | Kanou ............................ 174/50 |
| 7,671,275 B2 * | 3/2010 | Kubota ........................... 174/50 |
| 8,420,931 B2 * | 4/2013 | Soh et al. ........................ 174/50 |
| 8,878,059 B2 * | 11/2014 | Makino ............................ 174/50 |
| 8,941,009 B2 * | 1/2015 | Makino et al. .................. 174/50 |
| 2011/0139482 A1 | 6/2011 | Soh et al. |

FOREIGN PATENT DOCUMENTS

JP    2011-147327 A    7/2011

* cited by examiner

*Primary Examiner* — Angel R Estrada
(74) *Attorney, Agent, or Firm* — Locke Lord LLP

(57) ABSTRACT

Disclosed is a case for an electric junction box capable of preventing water that hits onto and bounds from a projection from invading into the case. The case for the electric junction box includes a synthetic resin made case main body, an upper cover, and a lower cover. Adjacent to a part where the case main body and the upper cover are joined a bracket for fixing car body that projects from an outer face of the case main body is disposed. The bracket is provided with a plurality of insertion holes for draining water. The plurality of insertion holes is also disposed throughout the bracket. In such the case, the water blown to the bracket falls down, without bounding, through the insertion holes, and thus making it possible to prevent the water from invading into the case.

8 Claims, 8 Drawing Sheets

CASE

CROSS REFERENCE TO RELATED APPLICATION

This application is on the basis of Japanese Patent Application NO. 2012-262085, the contents of which are hereby incorporated by reference.

TECHNICAL FIELD

This invention relates to cases for electric junction boxes to be mounted on automobiles.

BACKGROUND ART

Onto an automobile an electric junction box is mounted. The electric junction box is configured in various types, for example, as disclosed in the PTL 1, a case provided with a case main body, an upper cover covering an opening of an upside of the case main body, a lower cover covering an opening of a downside of the case main body. In the case, adjacent to a part where the case main body and the upper cover are joined and a part where the case main body and the lower cover are joined, brackets for fixing to a car body are disposed.

CITATION LIST

Patent Literature

[PTL 1]
Japanese Patent Application Laid-Open Publication No. 2011-147327

SUMMARY OF INVENTION

Technical Problem

Although the bracket is requisite for a case for the electric junction box, which cannot thereby be eliminated, when highly-pressured water (for example, highly-pressured washing water) is blown against the case, the water that hits onto and bounds from the bracket may invade into between the case main body and the upper cover or between the case main body and the lower cover.

Furthermore, the case for the electric junction box is provided with not only the bracket but an insertion part passing therethrough an electric wire of a wire harness and various projections such as fixing part of the wire harness. When these projections are disposed adjacent to a part where the case main body and the upper cover are joined, and a part where the case main body and the lower cover are jointed the water that hits onto and bounds from the bracket, may invade into the case in the same manner as the bracket mentioned above.

Therefore, an object of the invention is to provide a case for an electric junction box preventing water that hits onto and bounds from projections from invading into the case.

Solution to Problem

The invention of one aspect in order to achieve the foregoing object is related to a case for an electric junction box provided with a case main body, and a cover covering an opening of the case main body, wherein a projection is disposed adjacent to a part where the case main body and the cover are joined, and projects from one of an outer face of the case main body and an outer face of the cover, and wherein an insertion hole for draining water is disposed in the projection.

Preferably, the insertion holes are disposed in the plural throughout the projection.

Preferably, the projection includes an insertion part passing therethough an electric wire of a wire harness.

Preferably, the projection includes a bracket to be fixed to a fixing part with bolt.

Advantageous Effects of Invention

According to the one aspect of the invention, since the projection is provided adjacent to the part where the case main body and the cover are joined, and projects from one of the outer face of the case main body and the outer face of the cover, and the insertion hole for draining water is disposed in the projection, water that hits onto the projection falls down, without hounding, through the insertion hole. Thereby, it is made possible to prevent the water from invading into the case.

Furthermore, since the insertion holes are disposed in the plural throughout the projection, it is made possible to further prevent the water that hits onto the projection from bounding, and thus from invading into the case.

Furthermore, since the protection includes the insertion part passing therethough the electric wire of the wire harness, the water that hits onto the insertion part falls down without bounding through the insertion hole. Thereby, it is made possible to prevent the water from invading into the case.

Furthermore, since the projection includes the bracket to be fixed to the fixing part with bolt, the water that hits onto the bracket falls down without bounding through the insertion hole. Thereby, it is made possible to prevent the water from invading into the case.

DESCRIPTION OF EMBODIMENTS

First Embodiment

Referring now to FIGS. 1 to 6, a case for electric junction box according to a first embodiment of the invention is discussed. The electric junction box is designed to supply power and transmit signal to an electric component mounted onto the automobile.

Figure 1:
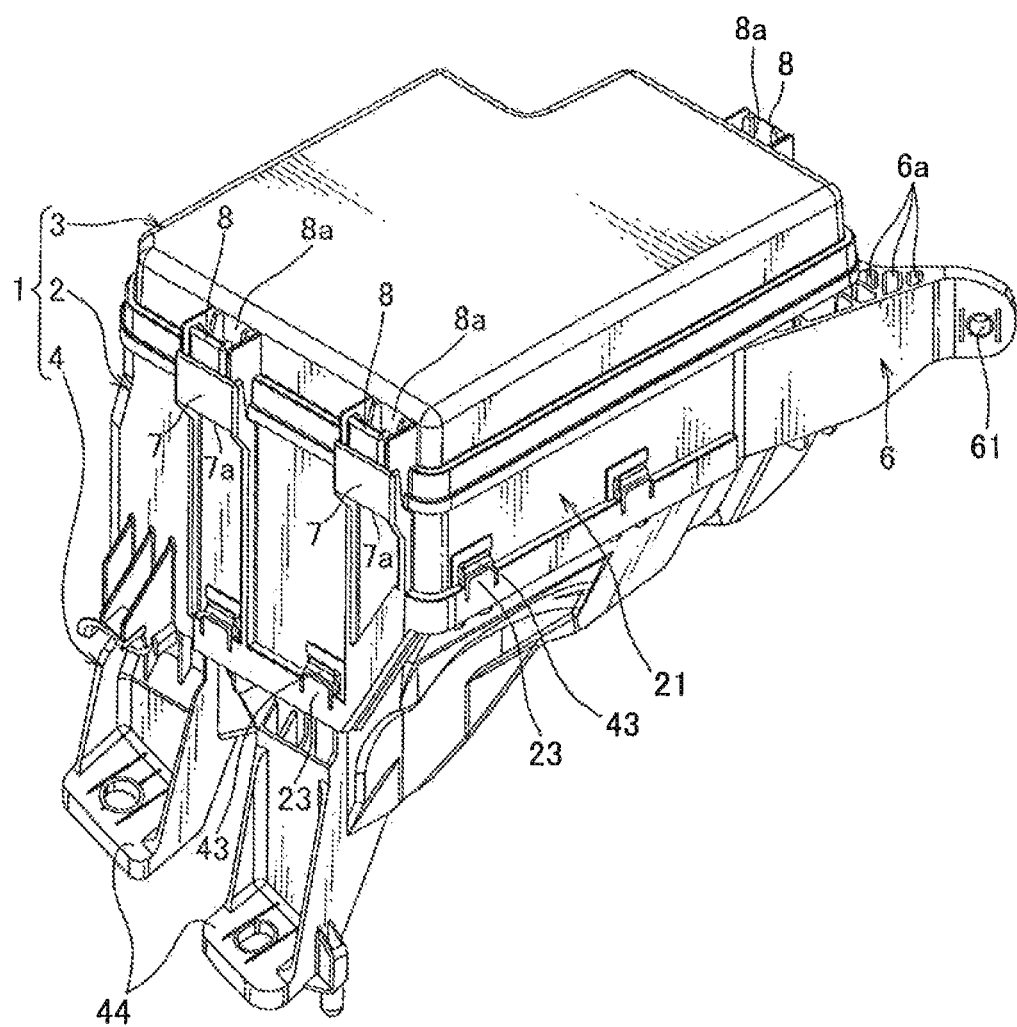
FIG. 1 is a perspective view illustrating a case for electric junction box according to one embodiment of the invention.

The forgoing electric junction box is, as shown in FIG. 1, provided with a case main body 2 to which a plurality of components is attached, an upper cover 3 (corresponding to a "cover" in the claims), and a lower cover 4 (corresponding to a "cover" in the claims). These case main body 2, upper cover 3, and lower cover 4 are mode of synthetic resin.

Figure 2:
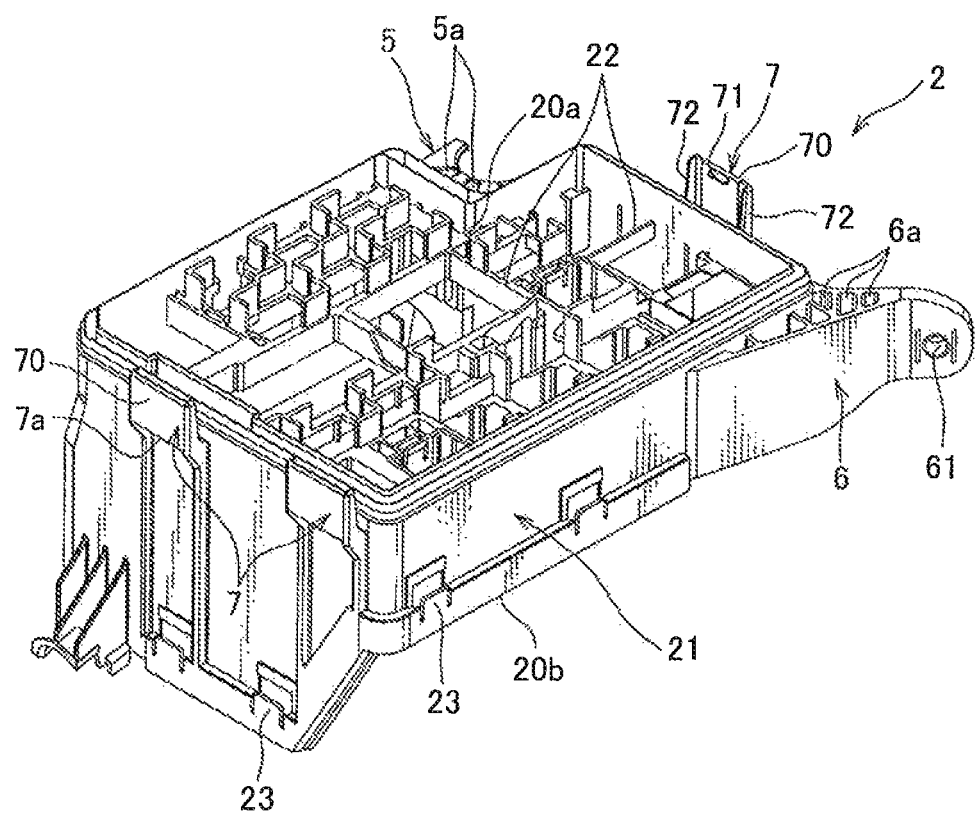
FIG. 2 is a perspective view illustrating a case main body shown in FIG. 1.
Figure 3:
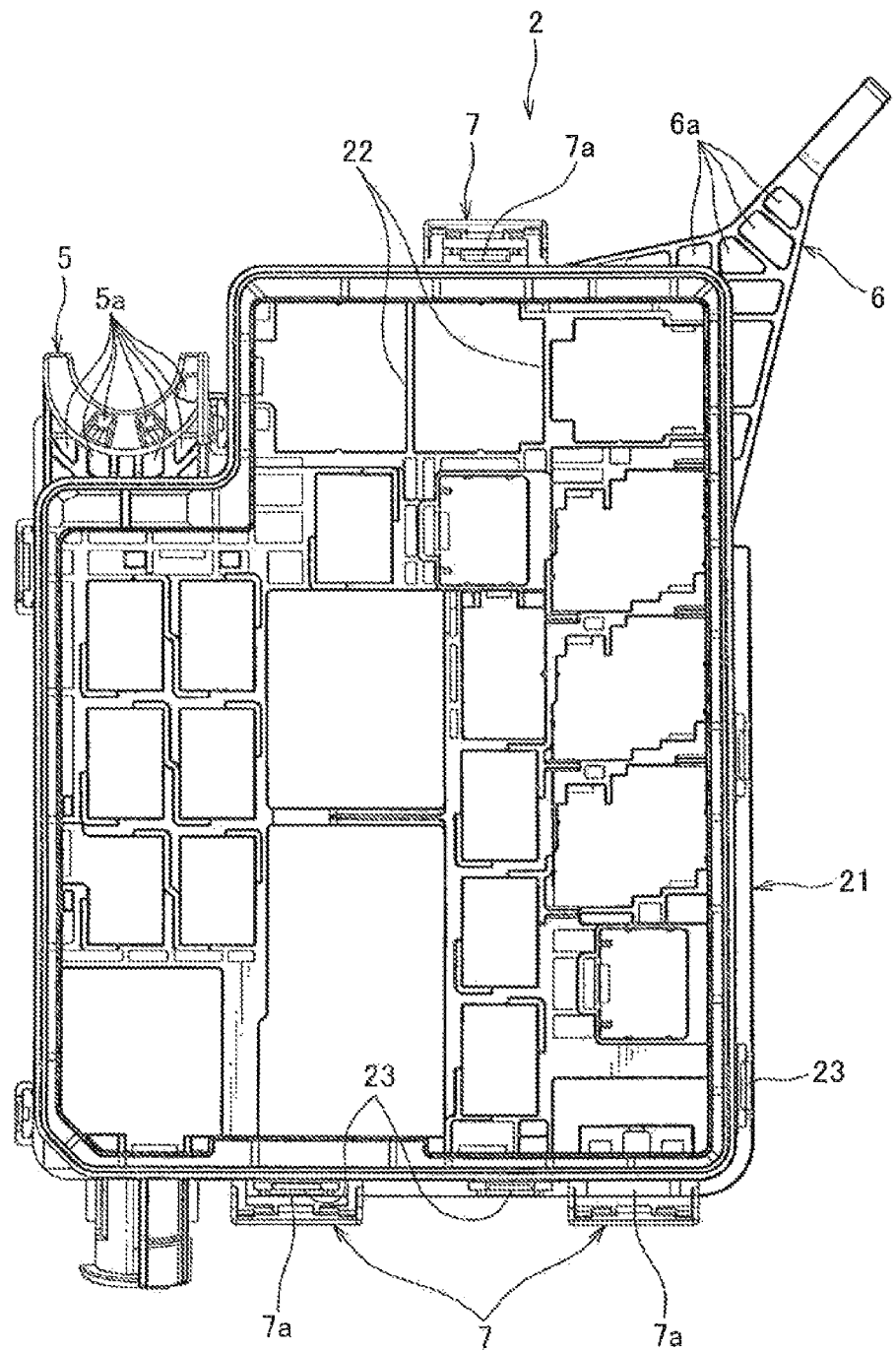
FIG. 3 is a plain view illustrating the case main body shown in FIG. 2.

The case main body 2 is provided with a tubular side wall 21 composing an outer wall, a partition wall 22 partitioning an inside of the peripheral wall 21, and an insertion dividing piece 5 as shown in FIGS. 2 and 3.

The upper cover 3 is arranged to cover an opening 20a surrounded by an upper end of the peripheral wall 21.

The lower cover 4 is arranged to cover an opening 20b surrounded by a lower end of the peripheral wall 21. The lower cover 4 is provided with a not-shown insertion dividing piece, and a bracket 44 to be fixed to a car panel 5. Also, the insertion dividing piece 5 of the case main body 2 and the insertion dividing piece of the lower cover 4 are overlaid together to compose a tubular "insertion part." The insertion part has an electric wire of the wire harness pass therethrough.

Adjacent to a part where the case main body 2 and the upper cover 3 are joined, a bracket 6 to be fixed to the car panel, and a latch part 8 and a latch receiving part 7 for fixing the case main body 2 and the upper cover 3. These bracket 6, latch part 8 and latch receiving part 7 correspond to "projections" in the claims.

Figure 4:
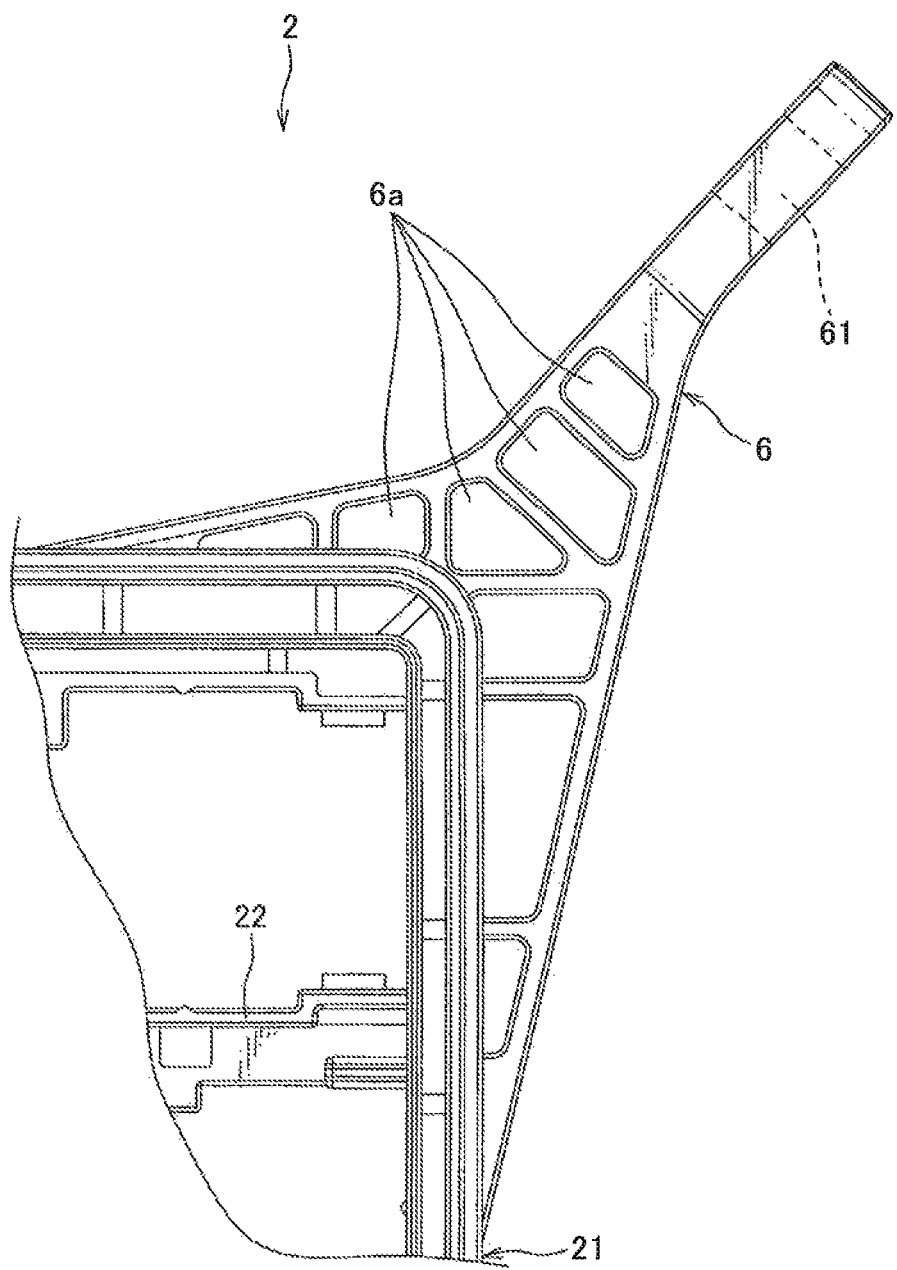
FIG. 4 is an enlarged view of a bracket shown in FIG. 3.

The forgoing bracket 6 projects from outside of the peripheral wall 21 as shown in FIG. 4, and is provided with a bolt insertion hole 61 at a distal end away from the peripheral wall 21. Also, in the whole area except a part where the insertion hole 61 of the bracket 6, a plurality of insertion holes 6a for draining water is provided.

As mentioned above, "projections" in the invention include a part where "insertion hole for draining water" cannot be formed in order to achieve essential features. In the bracket 6 the blot insertion hole 61 corresponds to what is mentioned above. In the invention "the whole area of the projections" is the whole area except a part where this insertion hole cannot be formed.

Also, in the invention, the "insertion hole for draining water" is an insertion hole vertically extending with the case 1 attached to the car body, by which is meant that the insertion hole is formed so largely as to smoothly drain water without collecting therewithin.

The aforementioned latch part 8 projects from an outer face of the upper cover 3. The latch part 8 is provided with a latch arm. Between this latch arm and the outer face of the upper cover 3 a space, that is, an insertion hole 8a for draining water is disposed.

Figure 6:
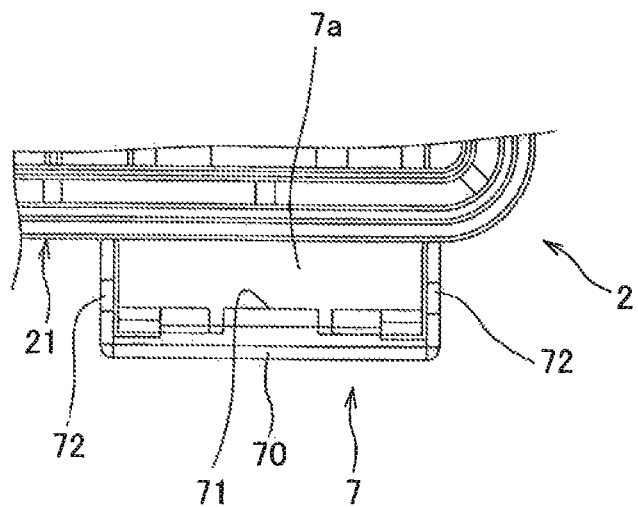
FIG. 6 is an enlarged view of a latch receiving part shown in FIG. 3.

The latch receiving part 7 projects from the outer face of the peripheral wall 21 as shown in FIG. 6. The latch receiving part 7 is provided with a plate 70 opposed to the peripheral wall 21, a projection 71 projecting from an inner face of the plate 70, and a pair of coupling part 72 coupling both ends of the plate 70 to the peripheral wall 21. With the projection 71 the latch arm of the latch part 8 is engaged. Also, between the plate 71 and the peripheral wall 21 a space, that is, an insertion hole for draining water 7a is disposed.

The foregoing insertion holes 7a and 8a serve as insertion holes for draining water even while the latch part 8 and the latch receiving part 7 are engaged with each other.

Figure 5:
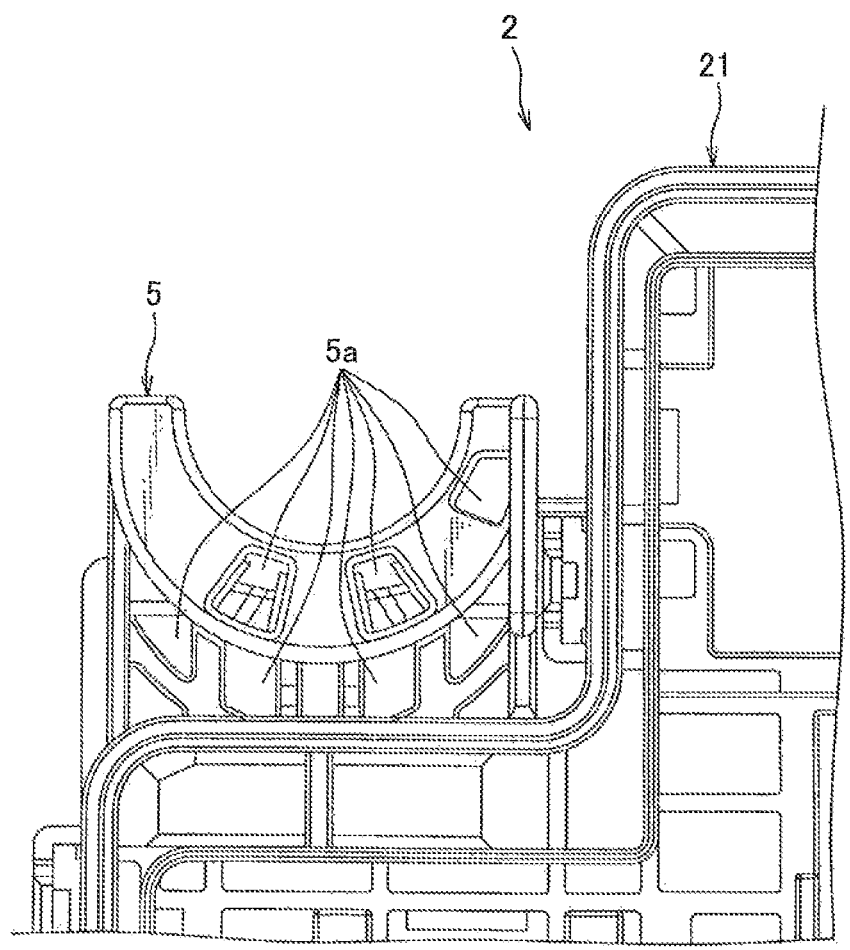
FIG. 5 is an enlarged view of a divided piece of an insertion part shown in FIG. 3.

Adjacent to a part where the case main body 2 and the lower cover 4 are joined, a latch part 43 and a latch receiving part 23 for fixing the case main body 2 and the lower cover 4, and the aforementioned insertion part are provided. This insertion part corresponds to "projection" in the claims. The insertion divisional piece 5 composing the insertion part is provided with an insertion hole 5a for draining water as shown in FIG. 5.

Since in the aforementioned case 1, the bracket 6, the latch 8, and the insertion divisional piece 5 disposed adjacent to the part where the case main body 2 and the upper cover 3 are joined and the part where the case main body 2 and the lower cover 4 are joined, are provided with the insertion holes 6a, 8a, 7a, and 5a, then the highly pressured water, such as highly pressured washing water, when hits onto the case 1, without bounding to the bracket 6, latch part 8, latch receiving part 7, and the insertion divisional piece 5, falls down through the insertion holes Be, 8a, 7a, and 5a. Therefore, it is made possible to prevent the water from invading into the case 1.

Second Embodiment

Figure 7:
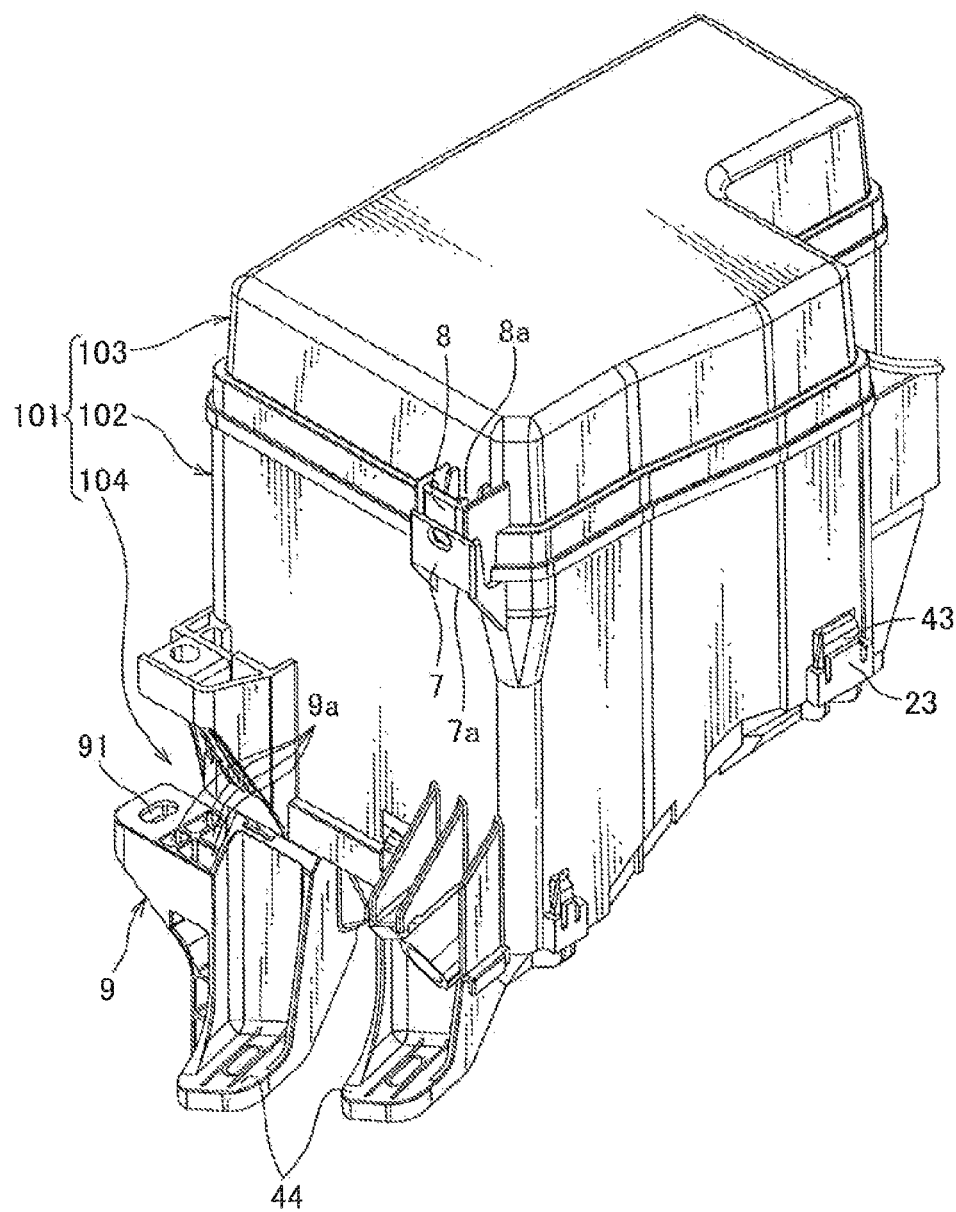
FIG. 7 is a perspective view of a case for an electric junction box according to a second embodiment of the invention.
Figure 8:
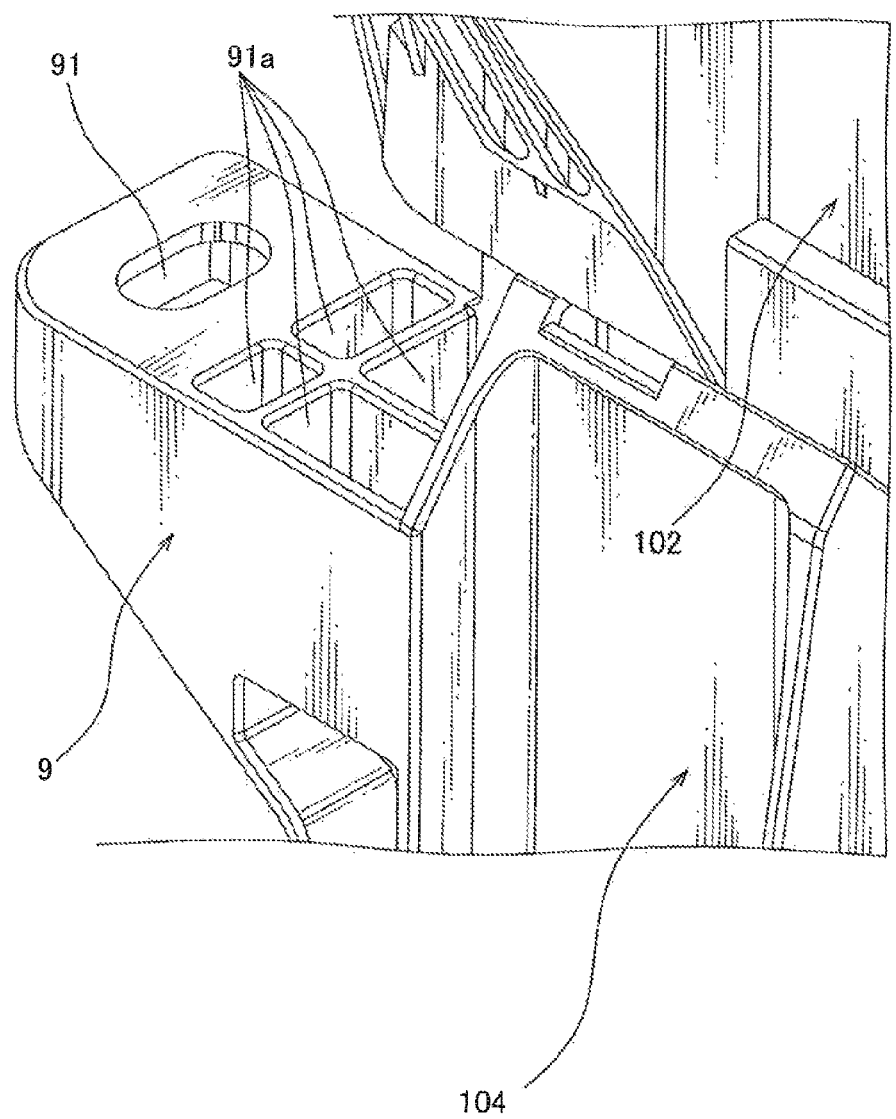
FIG. 8 is an enlarged view of a wire harness fixing part shown in FIG. 7.

Referring now to FIGS. 7 and 8, a case for an electric junction box according to a second embodiment is discussed. In FIGS. 7 and 8, the same components as the first embodiment mentioned above is also provided with the same reference signs and are not herein repeated to discuss.

The aforementioned case for electric junction box 101 is, as shown in FIG. 7, provided with a case main body 102 to which a plurality of components are attached, an upper cover 103 (corresponding to a "cover" in the claims), and a lower cover 104 (corresponding to a "cover" in the claims). These case main body 102, upper cover 103, and lower cover 104 are mode of synthetic resin.

Adjacent to a part where the case main body 102 and the upper cover 103 are joined, a latch part 3 and latch receiving part 7 for fixing the case main body 102 and the upper cover 103 is provided. These latch part 8 and latch receiving part 7 are, in the same way as the first embodiment, provided with the insertion holes 8a and 7a for draining water.

Adjacent to the part where the case main body 102 and the lower cover 104 are joined, a wire harness fixing part 9 is disposed. The wire harness fixing part 9 projects from an outer face of the lower cover 104 as shown in FIG. 8, and at a distal end away form the outer face of the lower cover 104 a clip insertion hole 91 is disposed. The clip insertion hole 91 is a hole into which a clip integrated with an electric wire bundle of the wire harness (such as what is formed integral with a combining band or a harness protector or the like, or what is wound to the electric wire bundle with tape) is fitted to be fixed. Also, in the whole area except a part where the clip insertion hole 91 of the wire harness fixing part 9, a plurality of insertion holes 9a for draining water is disposed.

Since in the aforementioned case 101, the latch part 8, the latch receiving part 7, and the wire harness fixing part 9 disposed adjacent to the part where the case main body 102 and the upper cover 103 combine and the part where the case main body 102 and the lower cover 104 are jointed is provided with the insertion holes 8a, 7a, and 9a, then the highly pressured water, such as highly pressured washing water, when hits onto the case 101, without bounding to the latch part 8, the latch receiving part 7, and the wire harness fixing part 9, falls down through the insertion holes 8a, 7a, and 9a. Therefore, it is made possible to prevent the water from invading into the case 101.

Note that the aforementioned embodiments merely discloses typical embodiments of the present invention, and is not intended to limit the invention. Namely, unless otherwise such changes and modifications depart from the scope of the present invention hereafter defined, they should be construed as being included therein.

REFERENCE SIGNS LIST 1, 101 case
2, 102 case main, body
3, 103 upper cover (cover)

4, 104 lower cover (cover)
5 insertion dividing piece
5a insertion hole
6 bracket (projection)
6a insertion hole
7 latch receiving part (projection)
7a insertion hole
8 latch part (projection)
8a insertion hole
9 wire harness fixing part (projection)
9a insertion hole
20a, 20b opening

The invention claimed is:

1. A case for an electric junction box, comprising:
a case main body; and
a cover covering an opening of the case main body; and
a projection that is disposed adjacent to a part where the case main body and the cover are joined, and projects from one of an outer face of the case main body and an outer face of the cover, wherein the projection has at least one insertion hole for draining water that is disposed within in a direction parallel to the cover and the case main body.

2. The case as claimed in claim 1, wherein the insertion holes are disposed in the plural throughout the projection.

3. The case as claimed in claim 1, wherein the projection includes an insertion part passing therethough an electric wire of a wire harness.

4. The case as claimed in claim 2, wherein the projection includes an insertion part passing therethough an electric wire of a wire harness.

5. The case as claimed in claim 1, wherein the projection includes a bracket to be fixed to a fixing part with bolt.

6. The case as claimed in claim 2, wherein the projection includes a bracket to be fixed to a fixing part with bolt.

7. The case as claimed in claim 3, wherein the projection includes a bracket to be fixed to a fixing part with bolt.

8. The case as claimed in claim 4, wherein the projection includes a bracket to be fixed to a fixing part with bolt.

* * * * *